United States Patent Office 3,558,744
Patented Jan. 26, 1971

3,558,744
PROCESS FOR MAKING POLYELECTROLYTE COMPLEX RESIN
Alan S. Michaels, Lexington, Michael J. Lysaght, Arlington, and Stephen A. Splitz, Scituate, Mass., assignors to Amicon Corporation, Lexington, Mass., a corporation of Massachusetts
No Drawing. Filed Jan. 5, 1968, Ser. No. 695,856
Int. Cl. C08f 33/08, 47/00
U.S. Cl. 260—874
5 Claims

ABSTRACT OF THE DISCLOSURE

A process for making and purifying polyelectrolyte complex resins wherein a heating step is used before the washing of said resin, said heating step contributing to the formation of a particularly easily-filterable form of resin and advantageously carried out at least above the glass transition temperature of the backbone polymers from which the polyelectrolyte complex resin is formed.

BACKGROUND OF THE INVENTION

Polyelectrolyte complex resins are the ionically-bound resins formed by the electronic interaction of a polyanion and a polycation. Polyelectrolyte complex resins are being produced in increasing quantities because of the large amount of research being done thereon and the various novel uses resulting from this research. These uses include antithrombogenic devices, contact lenses, and membranes for dialysis and ultrafiltration processes. Many other such uses are described in an article entitled "Polyelectrolyte Complexes" by Alan S. Michaels, appearing in Industrial and Engineering Chemistry, vol. 57, No. 10, October 1965, pp. 32–40.

The prior-art processes for forming such articles are relatively cumbersome and include the manipulation of very dilute solutions described in U.S. patent application Ser. No. 340,531, and the use of shielding solvents as described in U.S. Ser. No. 341,834 filed Jan. 24, 1964, by Alan S. Michaels, et al. These relatively cumbersome procedures were thought to be necessary because experimental work had shown that the large quantity of salts in commercially-available forms of polyelectrolytes caused problems in attempting to form stoichiometric polymers or any other uniform polymer formed by ionic association of a polyanion and a polycation in solutions which could be handled on conventional liquid-handling apparatus. Thus stoichiometric polyelectrolyte complex resins have heretofore been prepared (1) after an elaborate prepurification of the polyions to be reacted (as disclosed in an article entitled "Polycation-Polyanion Complexes . . . " in vol. 65, p. 1765, Journal of Physical Chemistry (1961) by Alan S. Michaels, or (2) in an extremely dilute and controlled aqueous reaction media as described in commonly-owned and copending U.S. patent application Ser. No. 340,531 filed Jan. 27, 1964 by Alan S. Michaels. In the former of these processes, the undesirable salt contaminants were largely removed from the reaction system by purification. In the latter process the effect of the salts is apparently minimized by dilution.

Other processes for the preparation of polyelectrolyte resin complexes require the careful use of relatively expensive and hard-to-handle organic solvent-containing reaction media.

SUMMARY OF THE INVENTION

Therefore, it is an object of the present invention to provide an improved process for making and purifying polyelectrolyte complex resins which process demands relatively small-volume equipment and results in the production of high-quality, purified resins.

It is a further object of the invention to provide novel process for purifying polyelectrolyte resins.

A further object of the invention is to achieve the foregoing objects without resort to organic solvents, thereby avoiding odor, toxicity and economic problems associated with their use.

Still other objects of the invention will be obvious to those skilled in the art on reading the instant specification.

Surprisingly, the above objects have been achieved by subjecting the polyelectrolyte complex resin to a heating step carried out at, for ionically-bound complexes a poly (sodium styrene sulfonate) and poly(vinylbenzyltrimethylammonium chloride), above about 80° C. This heating step can be carried out in a number of ways including the preheating of a water mass into which solutions of each polyelectrolyte are introduced and reacted. However, the most advantageous mode of the invention is to heat the polyelectrolyte complex resin either during or after the mixing of a reaction mass sufficiently concentrated (usually above about 15% polymer based on polymer and water present) so that it has the form of a paste or dough-like mass.

The most advantageous embodiments of the invention comprise the steps of
(1) mixing a polyanion and a polycation using only a small amount of liquid to allow formation of a viscous or dough-like paste and
(2) heating the resin, advantageously to a temperature of above about 80° C., and
(3) washing the filterable material with water.

Particularly surprising advantages of the above process include
(1) the fact that polyelectrolyte resin complexes may be formed either, (a) electronically-balanced resin or (b) an electronically-unbalanced resin (i.e. containing an excess of cation or anion) may be formed by using the process and
(2) the fact that high purity material—even to the extent of being free of the major quantity of counter ions—can be obtained by washing after, rather than before or during, the formation of the polymer product. This fact is particularly surprising in view of the known art wherein salt impurities are either removed from the polyions prior to resin formation or are present in only very dilute concentration during processing. In the instant process, the salts actually appear to contribute a beneficial plasticizing action during the high-shear mixing step.
(3) the mixing of the pasty or dough-like reaction masses actually appear to be facilitated by the presence of salts the effect of which was so diligently avoided by means of the prior art process.

One surprising advantage of the invention is the fact that the polyelectrolyte complex resin is in a form particularly susceptible to washing by filtration after being subjected to the heating step.

A particularly advantageous mode of the invention comprises the use of somewhat greater quantities of water than are associated with the commercial forms of polyanions, i.e. sufficient water to reduce the combined polyanion and polycation content of the mix to from about 5% to about 40%.

The viscosity of the paste may be selected with reference to the processing capabilities of the apparatus selected for use. In general a Cowles Dissolver will be suitably utilized with less viscous material. Heavier duty apparatus such as a 2-roll mill or the like is useful with more highly-viscous mixes. The particular apparatus utilized and the consistency of polyelectrolyte reaction mix processed thereon will determine the temperature reached by the polyelectrolyte complex resin as it is formed during the reaction step. High-shear apparatus such as a 2- or 3-roll mill can be conveniently utilized to process the reaction mix at temperatures as high at 70 to 98° C. or higher. When the polyelectrolyte complex being formed is subjected to such high temperature during the mixing step, it can be washed in relatively cool water and will form an easily-filterable and easily-washable mass. However, if the reaction step is carried out at relatively low temperature, say below that 75° C. it should be treated with water of at least 80° C. in order to form a readily-washable material. In any event the material should be treated at a temperature about the glass transition temperature of that "backbone" polymer, for example polystyrene in the case of poly(sodium styrene sulfonate), having the higher glass transition temperature of the two polyion backbone polymers which form the polyelectrolyte complex.

In general, the polyanions and polycations to be selected for use in the process of the invention are strongly dissociable polyions, i.e. those having ionic groups which groups would exhibit dissociation constants of $10^{-2}$ in water when associated with electrolyte monomer. Moreover, the polyions useful in the invention are conveniently of at least 30,000 in average molecular weight.

Among the polyanions which may be used in the present invention are poly(alpha-fluoro acrylic acid), poly (2,2-dichloro-3 butenoic acid), poly(4-vinylphenyl difluoro acetic acid), polyvinyl sulfuric acid, polyvinyl sulfonic acid, polyvinyl methylol sulfonic acid, polyvinyl toluene sulfonic acids, polystyrene sulfonic acid, poly-alpha-methylstyrene sulfonic acid, and the dissociable salts of such acids, preferably the sodium or potassium salts thereof. Of these the sulfonic acid polymers and their alkali metal salts are preferred.

Among the polycations which may be used in the present invention are poly(ethylene methyloxonium) chloride, poly(vinyl dimethyloxonium) chloride, poly (vinyl benzyldimethyl sulfonium) chloride, poly(vinyl benzyl-trimethyl phosphonium) chloride, poly(vinyl dimethyloxonium) chloride, polyvinyl pyridinium chloride, poly(diallyl dimethyl ammonium chloride), the heterocyclic amine polycation sold under the trade designation Ionac PP–2021 by Ionac Corporation, a Division of Ritter-Pfaudler, Inc., and the like. The quaternary ammonium compounds are most advantageously used as polycations in the process of the invention.

SOME ILLUSTRATIVE EXAMPLES OF THE INVENTION

The following specific working examples are given for the purpose of demonstrating the process of the invention and products produced thereby. These examples are not intended to be limiting of the scope of the invention and are presented for those skilled in the art who, on reading the instant specification, will be able to make various changes in reactants and processing conditions as suitable to their own situation.

Commercial materials were used as polyion starting products in each of the working examples. The poly (sodium styrene sulfonate) was supplied by Dow Chemical Company under the trade name ET–450. It had a molecular weight of 3,000,000 and contained by weight:

| | Percent |
|---|---|
| Polymer | 36 |
| NaBr | 33 |
| Monomer | 15 |
| $H_2O$ | 9 |
| $Na_2SO_4$ | 5 |
| NaOH | 2 |

The poly(vinyl benzyl trimethyl ammonium chloride) was obtained from Dow Chemical Company under the trade designation 2X–2611.12. It contained:

| | Percent |
|---|---|
| Polymer | 30–35 |
| Salts | 10–15 |
| Water | 50–60 |

Example 1

Four hundred grams of the poly(vinyl benzyl trimethyl ammonium chloride) solution described above and three hundred grams of the commercial poly(sodium styrene sulfonate) were blended together on a 2-inch radius 2-roll mill. A paste formed and this paste was sheared between the rolls for about 20 minutes. The rolls were neither heated nor cooled but the paste was observed to become extremely hot (80–100° C.) due to the mechanical work done thereon by the mill rolls. Surprisingly, this paste was hard and filterable when placed in cold water. Pastes formed with less shear, hence less temperature (as in a Waring Blendor) were not readily filterable unless treated in hot water.

Subsequently, the paste was removed from the roll mill and immersed in 3 gallons of water at room temperature. The paste was dispersed in the water with agitation for one-half hour. Thereupon, the solids were filtered and washed twice with a large excess of water, and dried. The resulting dry powder consisted of 180 grams of polyelectrolyte complex resin having 0.09 milliequivalent of excess cation ($H^+$) per gram of resin.

By excess cation is meant that amount of hydrogen ion which is present in the resin but which cannot be balanced by any known anions, such as chloride ions, present in the resin and is therefore, believed to be balanced by residual anion groups which are associated with the polyanion but which are not involved in crosslinked bonds with the polycation.

Example 2

A quantity of 230 grams of water was added to a Waring Blendor. Into this water, and with high agitation, were added 71 grams of poly (sodium styrene sulfonate) and then 105.0 grams of a 30% poly (vinyl benzyl trimethyl ammonium chloride) solution.

The resulting mixture of curd-like matter was poured into four liters of 98° C. water and stirred with the water by dispersator.

A granular precipitate formed during this mixing step. The precipitate was readily filterable and after fitering 3 times with large excesses of water at room temperature, the precipitate was dried to a powder.

Various powder-like materials such as asbestos, silica, and the like may be incorporated into the polyelectrolyte resin of the invention to provide modified physical properties which may be preferred for a particular application.

Example 3

A quantity of 36.96 lbs. of tap water was poured into the mixing bowl of a 10-gallon, double-bladed planetary mixer of the type sold by Charles Ross & Son Co. under the model designation HDM 10. To this water, 11.29 of a polyanion, commercially pure poly (sodium styrene sulfonate) powder, was added. The addition was carried out over a period of ten minutes. The polyion-water mixture was stirred for about 4 hours at the end of which time, a very viscous solution was obtained which solution was free of undissolved polyanion lumps. This resultant solution was amber brown in color. About 16.75 lbs. of a commercially pure polycation solution poly (vinyl benzyl trimethyl ammonium chloride) was added to the polyion solution with agitation being maintained during the addition. Immediately upon mixing of the polyanion and polycation, a white paste began to form. This paste had a heavy dough-like consistency.

About 65 lbs. of paste was obtained. Thirty lbs. of paste was placed in a polyethylene container and aged therein for one week. At the end of this time, about three lbs. and eleven ounces of liquid had exuded from the paste. The paste also appeared to have increased somewhat in toughness and rigidity.

This relatively rigid paste was washed in a 15-gallon, epoxy-lined, drum which drum was fitted with a faucet to allow discharge of wash liquid from the bottom thereof and further fitted with a hot water (95° C.) feed inlet at the top thereof. Into this drum had been inserted a cylindrical filter screen (100 mesh) open at the top and so shaped as to leave a ½-inch clearance between the inside wall of the drum and the screen. The drum was fitted with a 1 and ½ HP high-viscosity mixer of the type available from the Premier Company under the trade designation "3000 Series."

The drum was filled with 12 gallons of water and 26 lbs., 5 ounces of paste. Hot water was flowed through the drum at the rate of 30 gallons per hour.

The drainage water contained salts and other impurities but very little polyelectrolyte complex resin. After two hours of washing, 25 lbs. and 6 ounces of wet solids remained. This material was squeezed dry in an arborpress. About 7 and ½ lbs. of water were squeezed out of the resin by this squeezing action.

The remaining 17 lbs. and 14 ounces were wet to the touch until dried at 220° F. in a high circulation air oven. After 18 hours drying time, 2 lbs., 11.5 ounces of dry resin was removed from the oven. This material lost no more weight upon further heating.

Analysis showed that the resin contained about 0.23 ounce of salt (0.53%).

Example 4

Five hundred milliliters of an aqueous solution was prepared containing 15% by weight of poly (sodium styrene sulfonate) polymer. An equal volume of a separate aqueous solution was prepared containing 15% by weight of poly (vinylbenzyltrimethyl ammonium chloride) polymer. The two solutions were then poured rapidly into a vessel containing 10 liters of boiling water stirred with a large size Waring Blendor operated at second speed. After thorough mixing, the combined liquids were subjected to vacuum filtration to separate the ionically cross-linked polyelectrolyte polymer gel in the form of finely divided solid particles from the liquid. After a single washing with an amount of water equal to about 15 times the weight of the filter cake the ionically cross-linked polyelectrolyte gel was found to be pure.

What is claimed is:

1. In a process for forming and purifying a polyelectrolyte complex resin which comprises mixing together aqueous solutions of polycationic polymer and of polyanionic polymer containing a total of 5 to 40% by weight of said polymers to form a paste or precipitate, then separating the water therefrom by filtration, the step which comprises heating said paste or precipitate to a temperature above the glass transition temperature of each polymer before said filtration.

2. A process as defined in claim 1 wherein said temperature is at least about 80° C.

3. A process as defined in claim 1 wherein the polyanionic polymer is a sulfonic acid polymer.

4. A process as defined in claim 1 wherein the polycationic polymer is a quaternary ammonium polymer.

5. A process as defined in claim 1 wherein the polyanionic polymer is poly (styrene sodium sulfonate) and the polycationic polymer is poly (vinylbenzyltrimethyl ammonium chloride).

References Cited

UNITED STATES PATENTS

| | | | |
|---|---|---|---|
| 3,271,496 | 9/1966 | Michaels | 260—874X |
| 3,467,604 | 9/1969 | Michaels | 260—874X |

MURRAY TILLMAN, Primary Examiner

H. ROBERTS, Assistant Examiner

U.S. Cl. X.R.

210—37, 38; 260—2.1, 2.2, 29.6, 895, 899